United States Patent
Ampabathina et al.

(10) Patent No.: US 10,481,970 B2
(45) Date of Patent: Nov. 19, 2019

(54) DYNAMIC CLOUD DEPLOYMENT AND CALIBRATION TOOL

(71) Applicant: Bank of America Corporation, Charlotte, NC (US)

(72) Inventors: Kiran Kumar Ampabathina, Hyderabad (IN); Balamurali Lakshminarayanan, Chennai (IN); Kalyan Chakravarty Saraswatula, Hyderabad (IN); Rahul Devane, Pune (IN); Srinath Nelakuditi, Hyderabad (IN)

(73) Assignee: Bank of America Corporation, Charlotte, NC (US)

(*) Notice: Subject to any disclaimer, the term of this patent is extended or adjusted under 35 U.S.C. 154(b) by 184 days.

(21) Appl. No.: 15/823,895

(22) Filed: Nov. 28, 2017

(65) Prior Publication Data
US 2019/0163547 A1  May 30, 2019

(51) Int. Cl.
| | | |
|---|---|---|
| G06F 11/00 | (2006.01) | |
| G06F 11/07 | (2006.01) | |
| G06F 8/60 | (2018.01) | |
| H04L 29/08 | (2006.01) | |
| G06K 7/14 | (2006.01) | |
| H04L 29/06 | (2006.01) | |

(52) U.S. Cl.
CPC ............ *G06F 11/079* (2013.01); *G06F 8/60* (2013.01); *G06F 11/0709* (2013.01); *G06K 7/1417* (2013.01); *H04L 63/083* (2013.01); *H04L 67/10* (2013.01)

(58) Field of Classification Search
CPC ...... G06F 11/079; G06F 11/0709; G06F 8/60; H04L 67/10; H04L 67/34
See application file for complete search history.

(56) References Cited

U.S. PATENT DOCUMENTS

| | | |
|---|---|---|
| 8,255,529 B2 | 8/2012 | Ferris et al. |
| 8,271,653 B2 | 9/2012 | DeHaan |
| 8,316,125 B2 | 11/2012 | DeHaan |
| 8,402,139 B2 | 3/2013 | Ferris et al. |
| 8,504,689 B2 | 8/2013 | Ferris et al. |
| 8,799,997 B2 | 8/2014 | Spiers et al. |
| 8,909,784 B2 | 12/2014 | Ferris et al. |
| 8,930,941 B2 | 1/2015 | Vorthmann et al. |
| 8,984,610 B2 | 3/2015 | Spiers et al. |

(Continued)

OTHER PUBLICATIONS

Sankar Somepalle, "3 Service and 4 Deployment Models of Cloud Computing," Apr. 23, 2015.

(Continued)

*Primary Examiner* — Philip Guyton
(74) *Attorney, Agent, or Firm* — Weiss & Arons LLP; Michael A. Springs, Esq.

(57) ABSTRACT

Systems, apparatus and methods for intelligent deployment(s) of application objects are provided. The systems, apparatus and methods may include one or more dynamic parameters retrieved from metadata table(s). The parameter(s) may be used to calibrate the deployment(s). The parameter(s) may be associated with previous failed deployment(s). Calibration may be automatic. Calibration may include email sending and/or email previewing components. A testing environment may be used prior to actual deployment.

22 Claims, 5 Drawing Sheets

(56) References Cited

U.S. PATENT DOCUMENTS

| | | | |
|---|---|---|---|
| 9,209,979 B2 | 12/2015 | Spiers et al. | |
| 9,244,669 B2 | 1/2016 | Govindaraju et al. | |
| 9,354,939 B2 | 5/2016 | Ferris et al. | |
| 9,419,913 B2 | 8/2016 | Ferris et al. | |
| 2012/0297016 A1* | 11/2012 | Iyer | G06F 9/5072 709/217 |
| 2014/0130036 A1* | 5/2014 | Gurikar | G06F 8/61 717/176 |
| 2015/0347264 A1* | 12/2015 | Mohammed | G06F 11/3476 714/45 |
| 2017/0201569 A1* | 7/2017 | Fu | H04L 67/34 |
| 2018/0234288 A1* | 8/2018 | Soderlund | H04L 41/0645 |
| 2019/0155674 A1* | 5/2019 | Dhayapule | G06F 11/079 |

OTHER PUBLICATIONS

"Cloud Computing," https://en.wikipedia.org/wiki/Cloud_computing, Retrieved on Nov. 2, 2017.
Innocent Johnson, "Cloud Computing Deployment Models," https://dzone.com/articles/cloud-computing-deployment-models, DZone, Mar. 9, 2017.
"Cloud Service and Deployment Models," https://cloudcomputing.ieee.org/images/files/education/studygroup/Cloud_Service_and_Deployment_Models.pdf, IEEE Learning Library, Retrieved on Oct. 31, 2017.
Mridula Velagapudi, "SDLC for Cloud Computing—How is it Different From the Traditional SDLC?" https://bootstraptoday.wordpress.com/2012/02/06/sdle-for-cloud-computing-how-is-it-different-from-the-traditional-sdle/, Feb. 6, 2012.
"Software Deployment," 2017. https://en.wikipedia.org/wiki/Software_deployment, Oct. 31, 2017.
Jason Beckett, "Automate Software Deployment From a Central Location," https://www.manageengine.com/products/desktop-central/windows-software-installation.html, , Retrieved on Nov. 9, 2017.
"Simplify and Accelerate Your Multicloud Journey Today," https://www.cisco.com/c/dam/en/us/solutions/collateral/trends/cloud/solution-overview-c22-737893.pdf, Cisco, Retrieved on Nov. 1, 2017.
"Systems Development Life Cycles," https://en.wikipedia.org/wiki/Systems_development_life_cycle, Retrieved on Nov. 2, 2011.
"Public Clouds," http://whatiscloud.com/cloud_deployment_models/public_clouds, Retrieved on Oct. 31, 2017.
"Private Clouds," http://whatiscloud.com/cloud_deployment_models/private_clouds, Retrieved on Oct. 31, 2017.
"Hybrid Clouds," http://whatiscloud.com/cloud_deployment_models/hybrid_clouds, Retrieved on Oct. 31, 2017.
"Community Clouds," http://whatiscloud.com/cloud_deployment_models/community_clouds, Retrieved on Oct. 31, 2017.

* cited by examiner

DYNAMIC CLOUD DEPLOYMENT AND CALIBRATION TOOL

FIELD OF TECHNOLOGY

This disclosure relates to software deployment. More specifically, the disclosure relates to deployment of enterprise applications using cloud technology.

BACKGROUND

The introduction of cloud computing has been a revolution for the computing world. Cloud computing presents a resource for developing applications and objects that is flexible, scalable and robust. Cloud computing may provide almost immediate access to software environments, involving multi-tenancy of virtualized servers and other information technology ("IT") infrastructure.

However, deployment of application objects using cloud technology can involve unique complications. Challenges may emerge when using cloud computing to deploy applications to diverse and complex environments. Conventional efforts to calibrate deployments of cloud-based applications may be tedious, time-consuming and repetitive. Conventional methods of cloud deployment may also be prone to significant deployment errors. Undetected, mismatched attributes of deployed objects may create significant problems with deployed applications.

It would be desirable, therefore, to provide methods and apparatus for streamlining deployment of software applications and objects. It would also be desirable to provide methods and apparatus for reducing errors in the deployment of software applications and objects. It would further be desirable to provide methods and apparatus for reducing risk of malicious corruption of deployment of software applications and objects. It would also be desirable to provide methods and apparatus for detecting and/or tracking deployment changes and/or errors.

SUMMARY OF THE DISCLOSURE

Apparatus and methods for a smart cloud deployment engine are provided. The engine may include a processor. The engine may include machine readable memory. The engine may include a machine learning algorithm. The deployment engine may be configured for deployment of an application and/or object. The deployment engine may be configured for calibrating the deployment of the application and/or object. The application and/or object may be cloud-based. The deployment may be via one or more than one network. The deployment may be via the internet. The deployment may be via the cloud. The object may include an application object. The object may include a software code.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION

Figure 1:
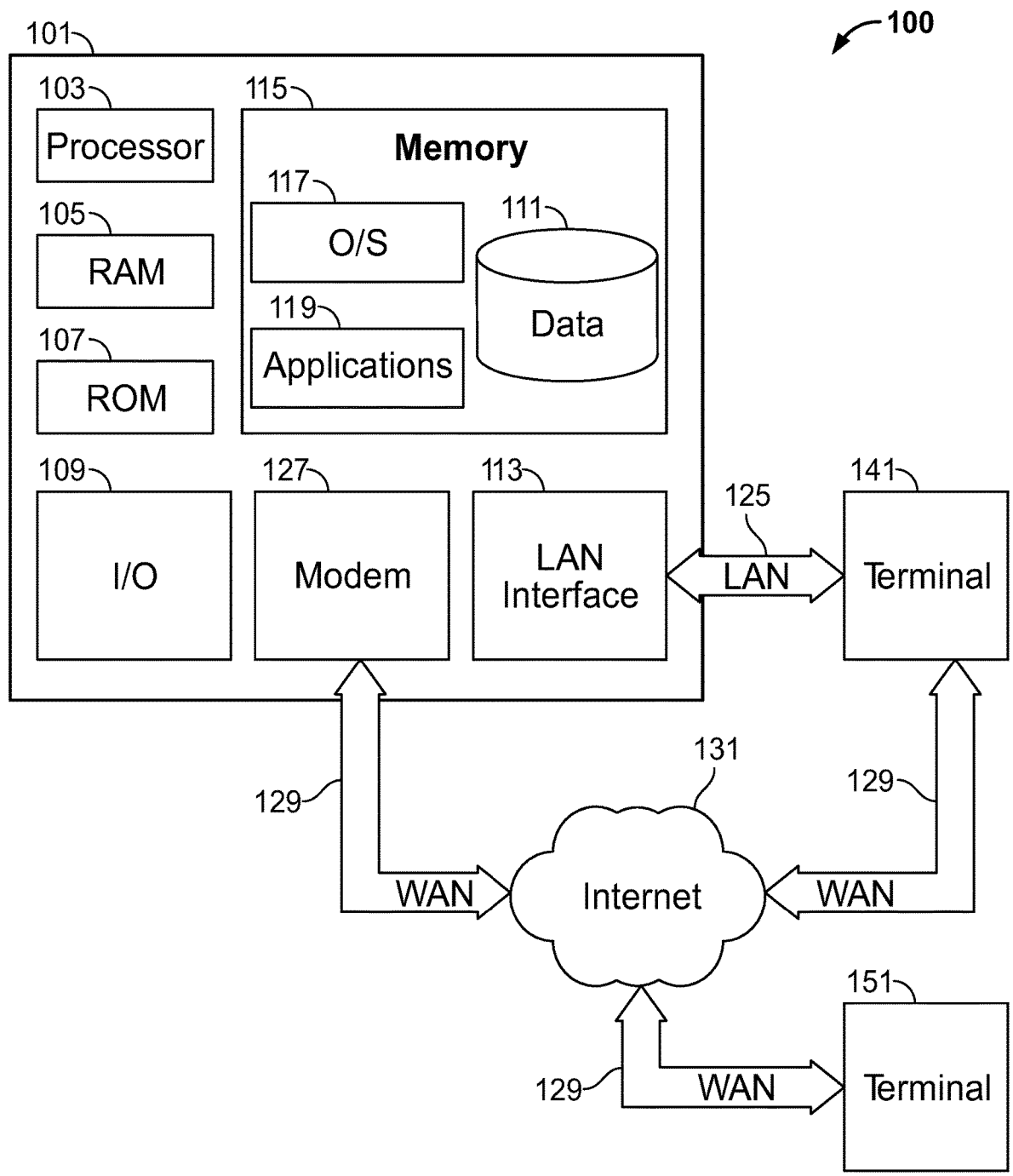
FIG. 1 shows illustrative apparatus in accordance with principles of the invention.

Apparatus and methods for an application object deployment engine are provided. The deployment engine may incorporate one or more than one semi-supervised machine learning algorithm. The engine may integrate deployment procedure(s) with remediation for deployment failure(s). The engine may integrate audit procedures with remediation for an audit failure. The engine may be configured to adjust deployment parameters based on past deployment results and past remediation measures.

The deployment engine may be configured to deploy one or more than one application. The engine may be configured to deploy one or more than one application object. The engine may be configured to deploy one or more than one product. The product may include the application. The product may include the object. The application may include the object. The product may be a software product. The object may include one or more than one component.

A deployment audit may review satisfaction of product deployment requirements. Deployment of a software product may include and/or involve one or more stages of a software development life cycle (SDLC). Illustrative stages include a development stage, component testing stage, a system testing stage, a functional testing stage and a production stage. Each stage may include a set of deployment guidelines.

The deployment guidelines for each stage may be embodied in one or more than one planning document and/or other associated protocol(s). An audit of the planning document may be based on a review of the deployment guidelines laid out in the document. The deployment guidelines may be related to one or more than one artifact. The artifact may include the document. The full SDLC may encompass a multitude of planning documents incorporating hundreds or thousands of corresponding development/deployment guidelines. For each planning document, the engine may identify corresponding guidelines and implement targeted remediation measures in the event of a deployment failure.

The deployment engine may be trained to identify deployment failures and deployment guidelines using a semi-supervised machine learning algorithm. The training may be based on existing data. For example, the training may be based on the deployment guidelines derived from a test plan.

The deployment engine may learn to classify newly added guidelines. The machine learning algorithm may incorporate a module for manual intervention. Semi-supervised machine learning renders the classification model adaptive, robust and scalable.

The deployment engine may be configured to access one or more reference systems that store data generated during development, deployment and testing processes. The reference systems may store information relating to test dates, test results, test parameters, or any other suitable information.

The deployment engine may include a code repository that enables a processor to connect to an outside system. Configuration of the engine may encode configurable item information and dependent system information. The configurable item information may include configurable XMLs that include user name and password. The configurable item information may include domain and project information. The XMLs may be in encrypted form.

A decision module may validate the deployment guidelines. Validation may determine whether each of the loaded deployment guidelines has been satisfied. The decision module may access various reference systems for product testing data. Examples of product testing data may include information relating to product test dates, product test results, product test parameters or any other suitable information. The deployment engine may determine if the deployment guideline has been satisfied based on the product testing data.

For example, the deployment guidelines may include a requirement that a test be passed within a specific time frame. The engine may access a reference system and locate test cases. The deployment engine may capture dates for test passes. The engine may determine that the tests were passed within the scheduled timeline.

Validation may proceed using a binary pass-fail model. Each deployment guideline or logical rule may be determined to be in a pass or fail state. A deployment guideline that has been satisfied may pass validation. A deployment guideline that has not been satisfied may fail validation.

The deployment engine may determine that all of the deployment guidelines have passed validation. When a deployment guideline has passed validation, the deployment engine may log report data indicating that the deployment guideline has passed validation. When all of the deployment guidelines have passed validation, the deployment engine may log report data indicating that the artifact has passed the audit. When all of the deployment guidelines have passed validation, the deployment engine may log report data indicating that the object has successfully deployed.

The deployment engine may determine that one or more of the deployment guidelines has not been satisfied. Failed validation of a deployment guideline may trigger remediation measures. The deployment engine may identify applicable remediation procedures associated with the one or more than one failed deployment guideline.

Failed validation of a deployment guideline may initiate a workflow notification module. The workflow may be dependent on the cause of the failure. The workflow may be dependent on the deployment guideline that has not been satisfied.

The deployment engine may hold the set of deployment guidelines in memory. The deployment engine may validate the deployment guidelines in an iterative process until all of the deployment guidelines have been satisfied. The deployment engine may repeat validation of the full set of deployment guidelines. The deployment engine may repeat validation of the failed deployment guideline(s) only.

The deployment engine may include a reporting module. The reporting module may store deployment report data. The reporting module may store information related to deployment guidelines that have failed validation. The reporting module may store information related to deployment guidelines that have passed validation. Deployment audit reports may be published to a project manager. The reporting module may include data analytics. Data analytics may be represented on a dashboard. The dashboard may be accessible by a project manager. The dashboard may be an interactive dashboard. The project manager may customize the dashboard to focus on different aspects of the data. Data analytics may be represented in the form of reports. The reporting module may send notifications regarding the reports to one or more project managers.

The deployment engine may include a self-learning module. The self-learning module may be semi-supervised. The self-learning module may modify deployment protocols with minimal user intervention. The intelligent learning module may modify deployment protocols without user intervention.

The self-learning module may access deployment report data. The self-learning module may identify a deployment guideline that has failed validation more than a predetermined threshold number of times. Prioritizing the deployment guideline may conserve resources by preventing iterative processing of the remaining rules.

The self-learning module may incorporate any suitable supervised or semi-supervised machine learning algorithm. The machine learning algorithm may include and/or involve a support vector machine. The support vector machine may be configured for linear or non-linear classification, regression analysis or any suitable algorithm. The support vector machine may use a training algorithm to build models for classification.

The deployment engine may include a non-transitory machine-readable memory. The non-transitory memory may store computer executable instructions. The deployment engine may include a processor configured to execute the computer executable instructions. For example, a processor circuit may be embedded in an integrated circuit board of the deployment engine. The processor may control overall operation of the deployment engine and its associated components.

The deployment engine may include RAM, ROM, an input/output ("I/O") module and a non-transitory or non-volatile memory. The I/O module may include a microphone, button and/or touch screen which may accept user provided input. The I/O module may include one or more of a speaker for providing audio output and a display for providing textual, audiovisual and/or graphical output.

Computer executable instructions such as software applications may be stored within the non-transitory memory and/or other storage media. The software may provide instructions to the processor that enable the deployment engine to perform various functions. For example, the non-transitory memory may store software used by the deployment engine, such as an operating system, application programs, web browser and a database. Alternatively, some or all of computer executable instructions of the deployment engine may be embodied in hardware or firmware components of the system.

Software application programs, which may be used by the deployment engine, may include computer executable instructions for invoking user functionality related to communication, such as email, short message service ("SMS"), voice input and speech recognition applications. Application programs may utilize one or more algorithms that classify deployment guidelines, validate deployment guidelines, perform data analytics or any other suitable tasks.

The deployment engine may operate in a networked environment. For example, the deployment engine may support network connections to other systems within the complex web and patch servers storing software patches. The deployment engine may support establishing network connections to one or more remote computers. Such remote computers may be nodes on a network. The nodes may be personal computers or servers that include many or all of the elements described above relative to the deployment engine.

The network connections may include a local area network ("LAN") and a wide area network ("WAN"), and may also include other networks. When used in a LAN networking environment, the deployment engine may be connected to the LAN through a network interface or adapter. The communication circuit may include the network interface or adapter.

When used in a WAN networking environment, the deployment engine may include a modem or other means for establishing communications over a WAN, such as the Internet. It will be appreciated that the existence of any of various well-known protocols such as TCP/IP, Ethernet, FTP, HTTP and the like is presumed, and the deployment engine can be operated in a client-server configuration to permit a user to retrieve web pages from a web-based server. Web browsers can be used to display and manipulate data on web pages.

The deployment engine and network nodes may include various other components, such as a battery, a speaker, and antennas (not shown). For example, network nodes may be portable devices such as a laptop, a tablet, chat-bot, a smartphone or any other suitable device for receiving, storing, transmitting and/or displaying relevant information.

The deployment engine may be operational with numerous other general purpose or special purpose computing system environments or configurations. Examples of well-known computing systems, environments, and/or configurations that may be suitable for use with the invention include, but are not limited to, personal computers, server computers, hand-held or laptop devices, tablets, mobile phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The deployment engine may utilize computer-executable instructions, such as program modules, executed by a computer. Generally, program modules include routines, programs, objects, components, data structures, etc. that perform particular tasks or implement particular data types. The deployment engine may be operational with distributed computing environments where tasks are performed by remote processing devices that are linked through a communications network. In a distributed computing environment, program modules may be located in both local and remote computer storage media including memory storage devices.

A device accessing the deployment engine may include one or more features of the deployment engine. The accessing device may include a smart phone. The accessing device may include a desktop computer. The accessing device may include a laptop computer. The accessing device may include a tablet. The accessing device may include a mainframe computer. The accessing device may include any device suitable for accessing the deployment engine.

The apparatus may include, and the methods may involve, an application deployment engine. The engine may include one or more than one algorithm. The deployment engine may be configured for deployment of an application and/or object. The deployment engine may be configured for calibrating the deployment of the application and/or object. The application and/or object may be cloud-based. The deployment may be via one or more than one network. The deployment may be via the internet. The deployment may be via the cloud. The object may include an application object. The object may include a software code.

The engine may be configured for testing the deployment in a simulation environment. The simulation environment may include a "sandbox". The sandbox may include an environment configured for testing the components prior to the deployment. The algorithm may include code for the testing. The testing may follow development of the application. The testing may precede deployment of the application. The testing may evaluate one or more components of the deployment. The testing may evaluate one or more features of the application.

The engine may include a processor. The processor may include the engine. The engine may include a machine-readable memory. The memory may include machine-executable instructions. The processor may perform one or more steps of the method. The instructions may instruct the processor to perform the steps of the method.

The deployment may be to an enterprise system associated with an enterprise. The deployment may be to an enterprise device. The deployment may be to one or more than one computer. The deployment may be performed remotely. The deployment may be performed automatically.

The deployment may include distributing the object. The deployment may include installing the object. The deployment may include updating the object. The deployment may include uninstalling the object.

The deployment may include creating one or more than one repository of packages. The packages may include the application and/or object. The packages may facilitate repeated installation and/or uninstallation of the software.

The engine may use one or more than one predefined template for the deployment. The engine may be configured to copy one or more than one installable component to a destination system. The engine may copy one or more than one installable component to a destination system prior to installing the object.

The engine may be configured to schedule the deployment. The application and/or object may be associated with one or more than one location of installation files. The application and/or object may be associated with one or more than one installation command. The application and/or object may be associated with one or more than one uninstallation command.

The engine may be configured to provide one or more than one option to validate one or more than one condition prior to installation of the object. The engine may be configured to provide one or more than one option to validate one or more than one condition prior to uninstallation of the object. The option may include checking for previous software versions. The option may include running one or more than one process of one or more than one dependent executables. The option may include checking free disk space. The option may include selecting whether to proceed with the installation and/or uninstallation. The option may include checking whether the installation was successful.

The engine may be configured to provide one or more than one template. The template may include one or more than one predefined template application. The template application may facilitate creation of the package(s). The template application may facilitate automatic creation of the package(s).

The instructions, when executed by the processor, may instruct the processor to receive authentication information of a user. Receipt of the authentication information may be mediated by hardware and/or software configured to perform the receipt. The hardware may include one or more than one scanner. The scanner may include a biometric scanner.

The authentication information may include one or more username. The authentication information may include personally identifying information. The authentication information may include one or more than one alphanumeric code. The authentication information may include one or more than one password. The authentication information may include one or more than one personal identification number (PIN). The authentication information may include biometric information. The authentication information may include geographic information. The authentication information may include any suitable identifying information, such as that presented in Table 1.

TABLE 1

Illustrative identification data.

Illustrative identification data name
full name
maiden name
mother's maiden name
alias
login name
screen name
nickname
personal identification number (PIN)
social security number (SSN)
passport number
driver's license number
taxpayer identification number
financial account number
credit card number
address information
personal street address
personal email address
personal telephone number
personal characteristic
photographic image
fingerprint
signature
handwriting
biometric data
retina scan
voice signature
facial geometry
genetic information
biometric behavioral signatures
hand gesture dynamics
keystroke dynamics
mouse movement
finger movement patterns
swipe patterns
eye tracking patterns
property information
vehicle identification number (VIN)
title number
asset information
digital identity
internet protocol (IP) address
media access control (MAC) address
birthplace
business telephone number
business email address
geographical indicators
employment information
education information The instructions, when executed by the processor, may instruct the processor to perform an authentication of the user based on the received authentication information. The authentication may include matching the authentication information to data previously stored in a database.

The processor may receive a selection by the user to perform an application and/or object transferal. The transferal may include the deployment. The instructions, when executed by the processor, may instruct the processor to receive a selection by the user to perform an application object transferal. The instructions, when executed by the processor, may instruct the processor to, after the authentication, receive a selection by the user to perform an application object transferal. The selection may include the application object selected for inclusion in the transferal. The selection may include a selected source environment of the object. The selection may include one or more than one selected entity unit receiving the transferal. The entity unit may include a business unit.

The instructions, when executed by the processor, may instruct the processor to perform retrieval of one or more than one previously stored parameter. The retrieval may be from a metadata table. The parameter may include a dynamic parameter.

The methods may include, and the apparatus may involve, a determination of a quality of the deployment. The deployment quality may be associated with a readiness of the object for the deployment. The deployment quality may be associated with a readiness of a component for the deployment. The instructions, when executed by the processor, may instruct the processor to perform the determination. The determination may be performed prior to the deployment.

The determination may be performed using an intelligent algorithm. The one or more than one algorithm may include the intelligent algorithm. The algorithm may depend on a detected status of the object. The object status may include a draft state. The object status may include a deleted state. The object status may include a stopped state. The object status may include a published state.

The algorithm may depend on one or more than one detected readiness. The algorithm may depend on one or more than one detected readiness value. The readiness value may be associated with the readiness. The readiness value may index the readiness. The algorithm may depend on a detected readiness of a target environment. The algorithm may depend on a detected readiness value of the target environment. The target environment may be associated with the selected business unit. The target environment may be associated with one or more than one client of the enterprise. The target environment may include a simulation environment. The deployment may be executed by the processor prior to deploying of the application to the client.

The algorithm may depend on a detected readiness of one or more component(s). The components may be associated with electronic transmission of the application object. The algorithm may depend on one or more than one detected readiness value of the component(s). The component(s) may be configured for electronic transmission of enterprise communication(s) to customer(s). The electronic communication component(s) may include and/or involve one or more emails. The electronic communication component(s) may include one or more than one email component. The email component(s) may include one or more than one email generating component. The email component(s) may include one or more than one email template.

The deployment, application and/or object may include and/or involve one or more than one preview component. The preview component may include previewing one or more features of the application and/or object. The preview component may include one or more than one email preview. The preview component may be configured to enable previewing the email(s). The email preview may be configured to enable previewing the email(s). The preview component may be configured to enable previewing the email component. The preview component may be configured to present the email template prior to transmission of the email to a customer. The preview component may be configured for verifying content of the email. The preview component may be configured to verify email data. The email data may include sender data associated with a sender of the email. The sender data may include a sender profile. The sender data may include a sender identifier. The sender data may include a sender name. The email data may include recipient data associated with one or more than one designated recipient of the email. The recipient data may include a recipient profile. The recipient data may include a recipient identifier. The recipient data may include a recipient name. The preview component may be configured to verify standardized content of the email. The preview component may be configured to verify personalization text. The preview component may be configured to verify personalized content of the email. The personalized content may include text specific to the recipient. The personalized content may include text specific to the sender.

The algorithm may depend on a detected readiness of the preview component. The algorithm may depend on one or more than one detected readiness value of the preview component.

The algorithm may depend on a detected readiness of components associated with an electronic transmission. The algorithm may depend on one or more than one detected readiness value of component(s) associated with one or more than one electronic transmission. The transmission may include and/or involve the application object.

The algorithm may depend on the dynamic parameter.

The instructions, when executed by the processor, may instruct the processor to, upon a failure of the deployment, insert parameters associated with the failed deployment into the metadata table for use in calibrating later deployment attempts.

The electronic transmission may include email. The electronic transmission may include a virtual drop box.

The determination may include assigning a risk-of-failure weight to the object status. The risk-of-failure weight assigned to the published state may be lower than the weight assigned to the draft state, the deleted state and/or the stopped state.

The determination may include assigning a risk-of-failure weight to the readiness of the preview component. The determination may include assigning a risk-of-failure weight to the readiness of the components associated with the electronic transmission. The determination may include assigning a risk-of-failure weight to the dynamic parameter.

The quality may be associated with a likelihood of the failure.

The apparatus may involve, and the methods may include, a method for deploying one or more than one cloud-based application object. The method may include calibration of the deployment.

The method may include authenticating a user. The authenticating may include collecting biometric data of the user. The biometric data may include and/or involve one or more than one retina scan, iris scan, fingerprint scan and/or any other suitable biometric information. The authenticating may include collecting location data of the user. The authenticating may include receiving a code from the user. The authenticating may include scanning the code. The code may be presented on a device of the user. The code may include a bar code. The bar code may include a matrix bar code. The matrix bar code may include a QR code.

The method may include selecting the application object for transferal. The object may include the application. The application may include the object. The object may include program code. The object may include enterprise software.

The method may include selecting a source environment of the object. The method may include selecting a source environment associated with the object.

The method may include selecting a destination environment for the transferal. The method may include selecting a destination environment for receiving the transferal.

The method may include retrieving one or more than one dynamic parameter from a metadata table. The dynamic parameter may include a failed parameter. The failed parameter may be associated with a failure of the deployment. The failed parameter may be associated with one or more than one previously failed deployment. The dynamic parameter may include a successful parameter. The successful parameter may be associated with a success of the deployment. The successful parameter may be associated with one or more than one previously successful deployment.

The method may include performing a determination of readiness of components of the application prior to deployment of the components. The determination may depend on a detected status of the components. The status may include the draft state, the deleted state, the published state and/or the stopped state.

The determination may depend on an evaluation of a readiness of the destination environment. The determination may depend on a detected readiness of the preview component. The determination may depend on one or more than one detected readiness value of the preview component. The determination may depend on a determined functionality of an electronic transmission of the object. The determination may depend on the dynamic parameters.

The method may include the deployment. The method may include attempting the deployment. The method may include executing the deployment. The method may include initiating the deployment. The method may include completing the deployment.

The method may include inserting the dynamic parameters into the metadata table. The method may include inserting the determination into the metadata table. The method may include inserting the dynamic parameters into the metadata table in association with the determination.

The method may include inserting the dynamic parameters into the metadata table in association with one or more than one indicator of one or more than one success level of the deployment. The success level may include a level of failure. The success level indicator may include one or more than one failed parameter. The success level indicator may include one or more than one successful parameter. The success level indicator may indicate a level of success of the deployment. For example, if five parameters included and/or associated with the deployment were successful and five parameters were unsuccessful, the success level may be 50%.

The apparatus may include, and the methods may involve, an application deployment system for performing a deployment of one or more than one cloud-based application. The application may include a plurality of components. The system may include the processor. The system may include the machine-readable memory. The memory may include machine-executable instructions. The instructions, when executed by the processor, may instruct the processor to evaluate a readiness of a target environment for receiving the deployment.

The instructions, when executed by the processor, may instruct the processor to, prior to the deployment, perform an assignment of a deployment-quality score to the deployment. The score may be based on one or more determinations. Each of the determinations may be associated with a weight contributing toward a total of the score. The score may be based on four determinations. Each of the four determinations may be associated with a weight contributing 25% toward the total score.

The determinations may include the determined status of the components. The determinations may include a determined readiness of an electronic transmission preview function included in the components. The preview function may include the preview component. The determinations may include a determined functionality of an electronic transmission send function included in the components. The send function may include the email component. The determinations may include a determined readiness of a dynamic component associated with a previously stored dynamic parameter.

The instructions, when executed by the processor, may instruct the processor to attempt the deployment. The instructions, when executed by the processor, may instruct the processor to initiate the deployment. The instructions, when executed by the processor, may instruct the processor to execute the deployment. The instructions, when executed by the processor, may instruct the processor to complete the deployment.

The instructions may add the total score to a metadata table. The instructions may add one or more than one dynamic parameter associated with the failure to a metadata table. The dynamic parameter may be associated with the failure. The instructions, when executed by the processor, may instruct the processor to, upon a detected failure of the deployment, add the total score and/or the dynamic parameter to the metadata table.

The apparatus may include, and the methods may involve, an application deployment engine for performing a deployment of one or more than one cloud-based application to one or more than one target environment. The application may include a plurality of components. The engine may include the processor. The engine may include the machine-readable memory. The memory may include machine-executable instructions. The instructions, when executed by the processor, may instruct the processor to, prior to the deployment, perform an assignment of a deployment-quality score to the deployment.

The score may be based on a plurality of determinations. The determinations may include the determined status of the application. The determinations may include a determined readiness of an electronic transmission preview component. The determinations may include a determined functionality of an electronic transmission send component. The determinations may include a determined readiness of one or more than one dynamic component including one or more than one dynamic parameter.

The instructions, when executed by the processor, may instruct the processor to evaluate a readiness of the target environment for receiving the deployment. The instructions, when executed by the processor, may instruct the processor to, upon a detected failure of the deployment, add the total score and one or more than one dynamic parameter associated with the failure to a metadata table.

The one or more than one target environment may include a plurality of target environments.

The instructions, when executed by the processor, may instruct the processor to, prior to the deployment, perform one or more than one authentication of one or more than one identifier of the user executing the deployment. The authentication may include collecting biometric data of the user. The authentication may include receiving one or more than one alphanumeric code from the user. The authentication may include collecting location data of the user. The authentication may include scanning one or more than one matrix bar code presented on one or more than one device of the user.

The instructions, when executed by the processor, may cause the processor to perform one or more than one attempt at deploying the application object. Upon a failure of the deploying, the instructions, when executed by the processor, may cause the processor to determine and/or detect one or more than one parameter associated with the failure. The instructions, when executed by the processor, may cause the processor to insert the parameter(s) into the metadata table for use in calibrating later deployment attempts.

The instructions, when executed by the processor, may cause the processor to perform one or more than one retrieving of one or more than one dynamic parameter from the metadata table. The at least one dynamic parameter may be associated, in the metadata table, with one or more than one success value of one or more than one previous deployment attempt.

The instructions, when executed by the processor, may cause the processor to perform a determination of one or more than one level of readiness of component(s) associated with the object. The determination may depend on the detected status of the components. The determination may depend on an evaluation of a readiness value of the destination environment. The determination may depend on a detected readiness value of a preview component of the object. The determination may depend on a determined functionality value of an electronic transmission of the object. The determination may depend on the dynamic parameter in association with the success value.

Upon the determination indicating a first level of readiness of the components, the instructions, when executed by the processor, may cause the processor to perform a recalibrating of one or more settings affecting the readiness. Upon the determination indicating a first level of readiness of the components, the instructions, when executed by the processor, may cause the processor to perform a recalculating of the determination based on the recalibrated settings. Upon the determination indicating a second level of readiness of the components, the instructions, when executed by the processor, may cause the processor to attempt deployment of the application object. The determined readiness indicated by the second level may be greater than the determined readiness indicated by the first level.

The instructions, when executed by the processor, may cause the processor to determine a success level of the deployment. The instructions, when executed by the processor, may cause the processor to adjust the success value of the dynamic parameter, in the metadata table, to include the determined success level of the deployment.

Upon the determination indicating a third level of readiness of the components, the instructions, when executed by the processor, may cause the processor to abort the deploying. Upon the determination indicating a third level of readiness of the components, the instructions, when executed by the processor, may cause the processor to pause the deploying. The third level may indicate a determined readiness less than the determined readiness indicated by the first level.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is to be understood that other embodiments may be utilized and that structural, functional and procedural modifications may be made without departing from the scope and spirit of the present disclosure.

The steps of methods may be performed in an order other than the order shown or described herein. Embodiments may omit steps shown or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

FIG. 1 is an illustrative block diagram of system 100 based on computer 101. The methods of the invention may involve and/or be implemented using a system, such as system 100. The apparatus of the invention may include a system, such as system 100.

Computer 101 may include processor 103 for controlling operation of computer 101 and associated components. Computer 101 may include RAM 105, ROM 107, input/output ("I/O") module 109 and memory 115. Processor 103 may execute software running on computer 101, —e.g., operating system 117. Other components commonly used for computers such as EEPROM or Flash memory or any other suitable components may also be part of computer 101.

Memory 115 may be comprised of any suitable permanent storage technology—e.g., a hard drive. Memory 115 may store software, such as operating system 117, application(s) 119 and data 111, used for operation of system 100. Alternatively, or additionally, some or all of the computer-executable instructions may be embodied in hardware or firmware (not shown). Computer 101 may execute the instructions embodied by the software to perform various functions, such as one, some or all of the steps of the methods.

I/O module 109 may include wired and/or wireless (e.g., via BLUETOOTH™ and/or WiFi™ connection(s)) connectivity to a microphone, keyboard, touch screen, and/or stylus through which a user of computer 101 may provide input. I/O module 109 may include one or more speakers for providing audio output. I/O module 109 may include one or more than one video display device for providing textual, audiovisual and/or graphical output. System 100 may be connected to other systems via, for example, LAN interface or adapter 113.

System 100 may operate in a networked environment supporting connections to one or more remote computers, such as terminals 141 and 151. Terminals 141 and 151 may include personal computer(s) and/or server(s) that may include similar element(s) to those described in connection with system 100. The connections may include local area network (LAN) 125. The connections may include wide area network (WAN) 129. The connections may include other network(s). When used in a LAN networking environment, computer 101 may be connected to LAN 125 through LAN interface 113. When used in a WAN networking environment, computer 101 may include modem 127 or other means for establishing communications over WAN 129, such as Internet 131.

It will be appreciated that the network connections shown are illustrative and other means of establishing a communications link between the computers may be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Additionally, or alternatively, application program(s) 119, which may be used by computer 101, may include machine-executable instructions for invoking user functionality related to communication, such as email, Short Message Service (SMS), and voice input and speech recognition applications.

Computer 101 and/or terminals 141 and/or 151 may also comprise devices including various other components, such as one or more than one battery, speaker, and/or antenna (not shown).

Terminal 151 and/or terminal 141 may comprise portable devices such as one or more than one laptop, tablet, cell phone, or any other suitable device for storing, transmitting and/or transporting relevant information. Terminals 151 and/or terminal 141 may comprise other devices. These devices may be identical to system 100 or different. The differences may be related to hardware components and/or software components.

Figure 2:
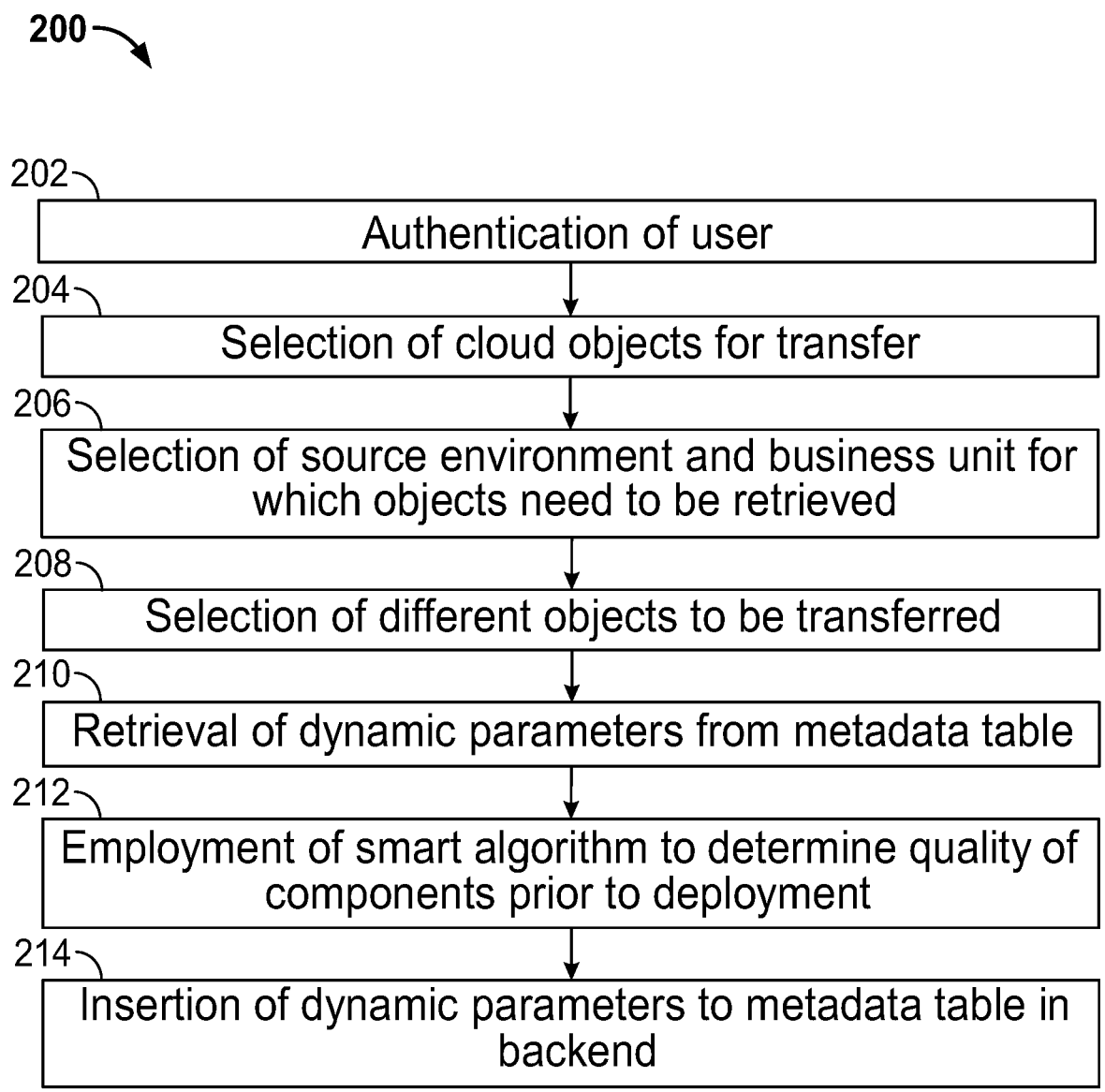
FIG. 2 is a flow chart of an illustrative process in accordance with principles of the invention.

FIG. 2 shows illustrative calibrated deployment process 200. Process 200 may include and/or involve one or more steps, apparatus and/or features described with regard to system 100 (shown in FIG. 1). Process 200 may begin at step 202.

At step 202, a user may be authenticated. A user interface may prompt the user to submit one or more identifiers. A machine executable program code, including machine-readable instructions, may instruct a processor to authenticate the identifier(s) against data previously stored in a database.

At step 204, upon successful authentication of the submitted identifiers, the user may perform a selection for transferring one or more than one cloud object to a destination environment. The transferring may include deployment of the object. The object may include one or more than one software application. In some embodiments, the user may be prompted to select the object.

At step 206, the user may be prompted to select a source environment associated with the deployment. The user may select one or more than one business unit for which the object(s) need to be retrieved. The business unit may be associated with a destination environment.

At step 208, the user may be prompted to select the objects for deployment. The user may select one or more components of the objects for deployment.

At step 210, one or more dynamic parameters may be retrieved from a metadata table. The parameters may be associated with previous failed deployments. The parameters may be associated with previous successful deployments. Retrieval of the parameters may be automatic. A processor may perform the retrieval, when executing the instructions.

At step 212, the processor executing the instructions may employ one or more than one algorithm to determine one or more than one quality of the components prior to the deployment. The algorithm may include an intelligent algorithm. The algorithm may involve machine learning. The quality may suggest a likelihood of success of the deployment.

The algorithm may evaluate a status of the components. The status may be one of: draft, deleted, published or stopped.

The algorithm may evaluate a completeness of a target environment. The target environment may include the destination environment. The completeness may include readiness. The target environment may include a target "sandbox". The target sandbox may include an environment configured for testing the components prior to the deployment.

The algorithm may include verifying a preview prior to the deployment. The algorithm may evaluate the preview verification prior to the deployment.

The algorithm may evaluate dependency of the email on a cloud send email functionality. The algorithm may evaluate the send email functionality. The cloud send email functionality may include functioning of the email component. The functioning of the email component may include presentation and transmission of the email(s) and/or email template(s).

The algorithm may involve the retrieved dynamic parameters. The algorithm may determine the likelihood of success based on retrieved parameters. The algorithm may adjust the components based on the likelihood.

At step 214, upon a failure of the deployment, one or more parameters associated with the failure, may be inserted into the metadata table for use in calibrating future deployments. Upon successful deployment, one or more parameters associated with the successful deployment, may be inserted into the metadata table for use in calibrating future deployments.

Figure 3:
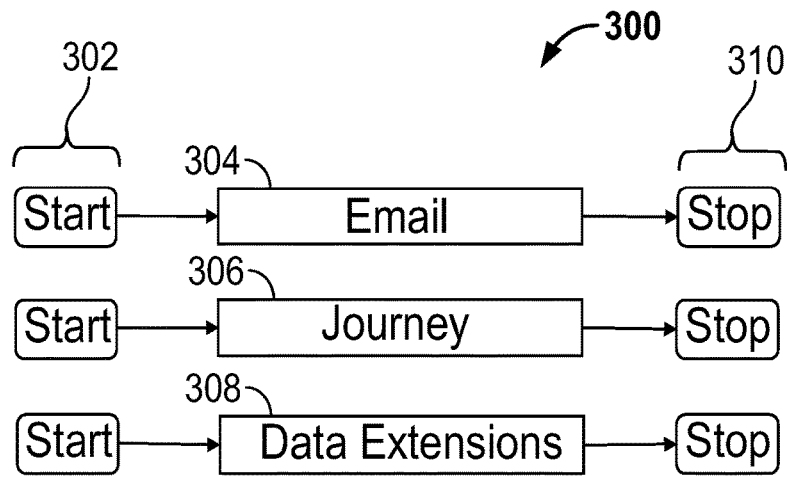
FIG. 3 is a flow chart of an illustrative process in accordance with principles of the invention.

FIG. 3 shows illustrative deployment process 300. Process 300 may begin at step 302. Process 300 may include conventional steps of deployment. Process 300 may lack calibration of the deployment. Process 300 may lack an intelligent algorithm.

At step 302, a user may initiate the deployment. The user may attempt to deploy a plurality of components.

The components may include email component 304. Email component 304 may be configured to send one or more than one email. The email(s) may be sent to one or more associates of the enterprise. The associates may include clients of the enterprise. The clients may include customers. Email component 304 may include and/or involve one or more than one email template. The email may include and/or involve the template. The template may be selected from a set of templates. For example, email component 304 may include product information emailed to enterprise clients. The information may include advertising. The enterprise may include a bank. The product may include a loan and/or any other suitable offering offered by the enterprise.

The components may include journey component 306. Journey component 306 may be configured to track client behavior. Journey component 306 may be used by one or more enterprise marketing associates. Journey component 306 may be configured to create one or more than one chart. Journey component 306 may be configured to enable creating the chart. The chart may include a flow chart. Journey component 306 may be configured to track customer behavior for marketing purposes. The chart may present how a brand may respond to customer interaction(s) with a product associated with the brand. The brand may be associated with the enterprise. The product may be produced by the enterprise. The object and/or component(s) may be configured such that, depending on a customer response and/or other predefined conditions one or more than one corresponding email will be sent out to the customer(s). The behavior may include the response. Journey component 306 may be configured to determine one or more than one next step geared toward marketing to the customer(s) based on the behavior.

The components may include data extension component(s) 308. Data extension component(s) 308 may include data. Data extension component(s) 308 may include one or more than one application database of the data. Data extension component(s) 308 may include one or more than one table. The database may include the table(s). The table(s) may include the data. Data extension component(s) 308 may include one or more than one graphical representation of the data, such as a chart and/or graph. The data may relate directly to one or more than one subscriber. The data may include information regarding the subscriber(s). The subscriber(s) may include associate(s) of the enterprise. The subscriber(s) may include client(s) of the enterprise. The subscriber(s) may include customer(s) of the enterprise. The recipient(s) may include the subscriber(s). The data may include identification of the recipient(s). Data extension component(s) 308 may be used to generate one or more than one report. The report(s) may include and/or involve the data.

At step 310, the deployment may result in a failure. One or more of the components may be insufficiently calibrated to accomplish a successful deployment. There may be no record of the failure. There may be no indication of a cause of the failure. The failure may be due to human error. The failure may be due to a machine error. Any one of the components may have caused the failure.

Figure 4:
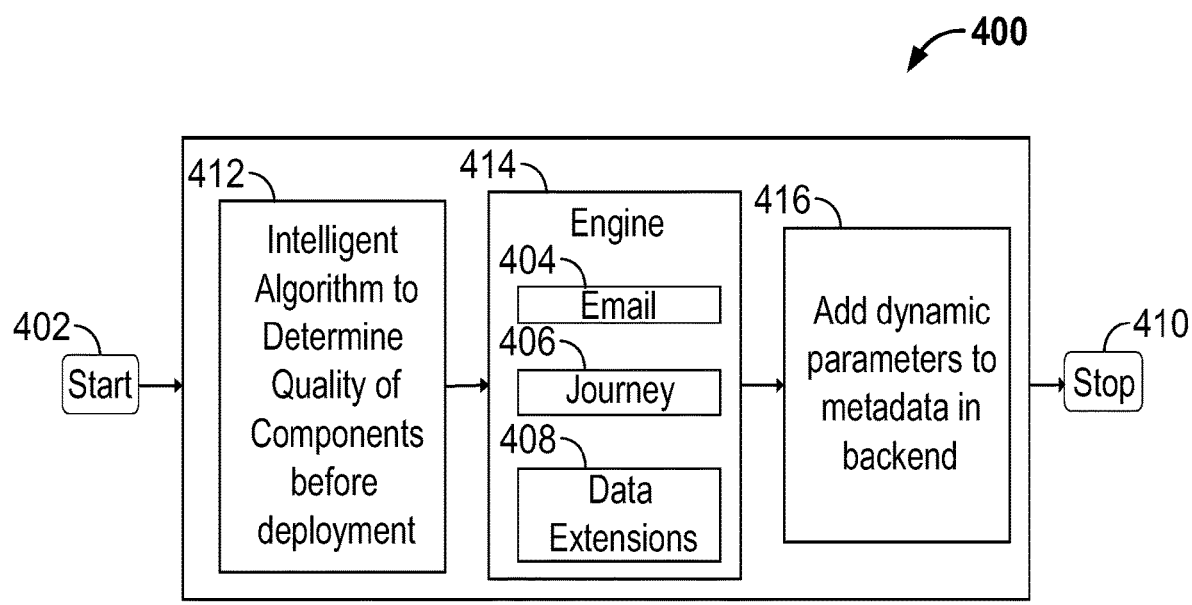
FIG. 4 is a flow chart of an illustrative process in accordance with principles of the invention.

FIG. 4 shows illustrative calibrated deployment process 400. Process 400 may include and/or involve one or more steps, apparatus and/or features described with regard to system 100 (shown in FIG. 1). Process 400 may include and/or involve one or more steps, apparatus and/or features described with regard to process 200 (shown in FIG. 2). Process 400 may include and/or involve one or more steps, apparatus and/or features described with regard to process 300 (shown in FIG. 3). Process 400 may begin at step 402.

At step 402, a user may initiate the deployment. The user may attempt to deploy a plurality of components. The components may include email component 404. Email component 404 may include some or all features of email component 304 (shown in FIG. 3). The components may include journey component 406. Journey component 406 may include some or all features of journey component 306 (shown in FIG. 3). The components may include data extension component(s) 408. Data extension component 408 may include some or all features of data extension component 308 (shown in FIG. 3).

At step 412, an intelligent algorithm may determine a quality of the components prior to the deployment. A processor executing instructions may employ the algorithm to determine the quality of the components. The algorithm may involve machine learning. The quality may suggest a likelihood of success of the deployment.

The algorithm may evaluate a status of the components. The status may be one of: draft, deleted, published or stopped.

The algorithm may evaluate completeness of the target environment. The target environment may include the destination environment. The completeness may include readiness. The algorithm may evaluate completeness of the target "sandbox".

The algorithm may include a preview verification prior to the deployment. The algorithm may evaluate components via the preview verification.

The algorithm may evaluate dependency of the email on a cloud send email functionality. The algorithm may evaluate the send email functionality.

The algorithm may involve retrieved dynamic parameters. The algorithm may determine the likelihood of success based on the retrieved parameters. The algorithm may adjust the components based on the likelihood.

Smart deployment engine 414 may employ the algorithm to calibrate the deployment. Engine 414 may include the processor. Engine 414 may include the instructions. Engine 414 may mediate the deployment such that weight(s) are assigned to component(s) of the deployment prior to the deployment. Engine 414 may determine readiness of the component(s) of the deployment.

The component(s) may include email component 404. Email component 404 may include one or more of the features described regarding email component 304 (shown in FIG. 3). Email component 404 may include email component 304.

The component(s) may include journey component 406. Journey component 406 may include one or more of the features described regarding journey component 306 (shown in FIG. 3). Journey component 406 may include journey component 306.

The component(s) may include data extension component(s) 408. Data extension component 408 may include one or more of the features described regarding data extension component 308 (shown in FIG. 3). Data extension component 408 may include data extension component 308.

Engine 414 may assign the weight(s) to the component(s). Engine 414 may predict the likelihood. Engine 414 may calibrate the deployment based on the likelihood. The weight(s) may reflect previous failure/success data. The previous failure/success data may suggest a proportional role of the component(s) associated with the weight(s) toward the likelihood of success. The previous failure/success data may indicate a correlation between component settings and success/failure of object deployment. The settings may include the parameter(s).

The algorithm may include a statistical analysis. The statistical analysis may associate the data with the likelihood. The statistical analysis may include correlating previous parameter(s) with success(es) and/or failure(s). The algorithm may determine the correlation. The statistical analysis may include and/or involve determining the correlation. The correlating may be performed using any suitable technique. For example, a success/failure rate of deployment may be linearly, or non-linearly, regressed upon the parameter(s), modeled on the parameter(s), predicted from the parameter(s) or estimated from the parameter(s). The correlating may be performed utilizing a multivariate statistical model or a neural network. The correlation may include determining a correlation coefficient that indicates a degree of correlation between two sets of the data.

At step 416, dynamic parameters associated with the deployment may be inserted into a metadata table. Upon a failure of the deployment, one or more parameters associated with the failure, may be inserted into the metadata table for use in calibrating future deployments. Upon successful deployment, one or more parameters associated with the successful deployment, may be inserted into the metadata table for use in calibrating future deployments.

At step 410, the deployment may be complete. The deployment may have been successful. A log may be kept of the successful deployment. The deployment may have failed. A log may be kept of the failed deployment.

Figure 5:
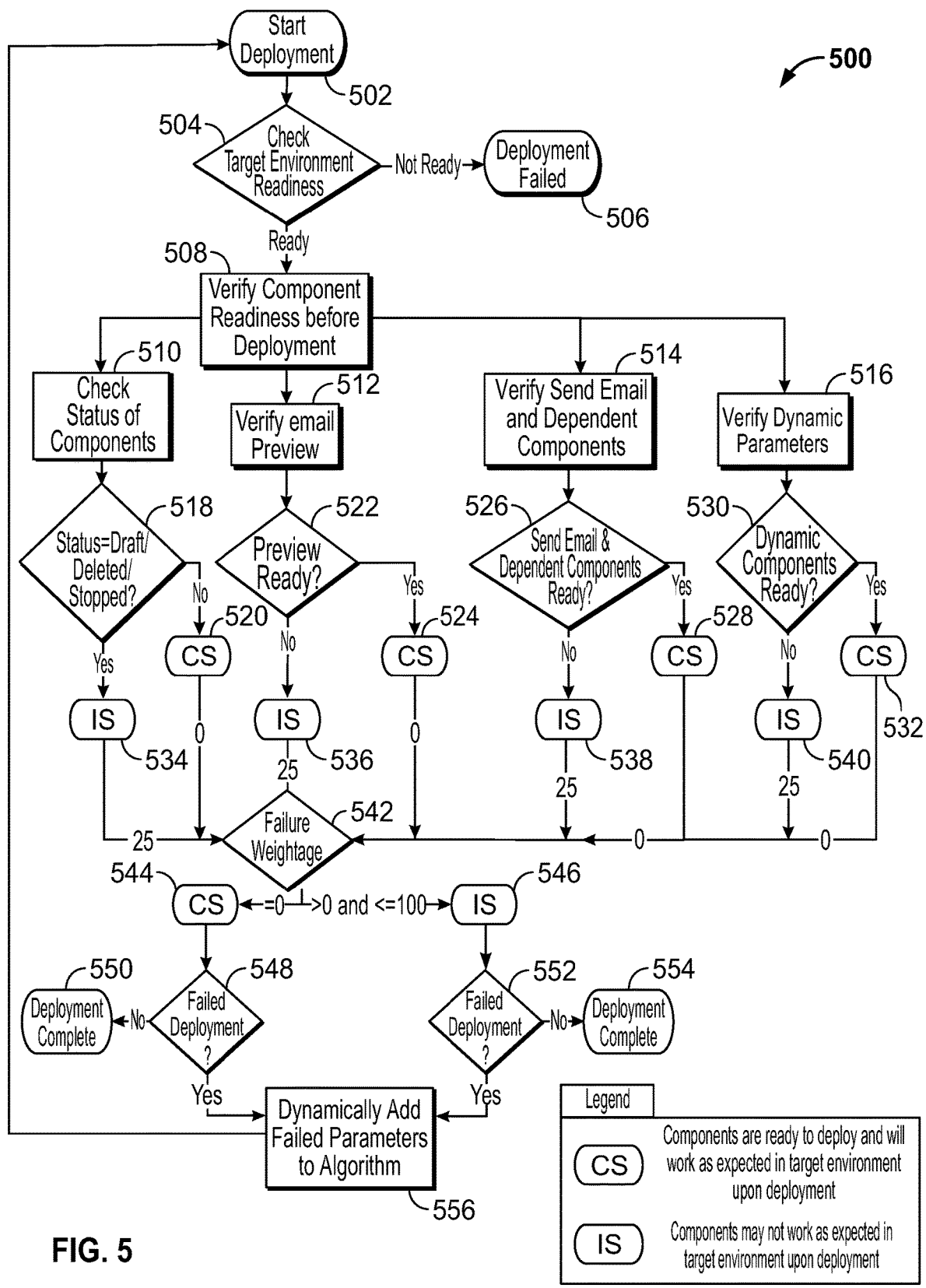
FIG. 5 is a flow chart of an illustrative process in accordance with principles of the invention.

FIG. 5 shows illustrative calibrated deployment process 500. Process 500 may include and/or involve one or more steps, apparatus and/or features described with regard to system 100 (shown in FIG. 1). Process 500 may include and/or involve one or more steps, apparatus and/or features described with regard to process 200 (shown in FIG. 2). Process 500 may include and/or involve one or more steps, apparatus and/or features described with regard to process 300 (shown in FIG. 3). Process 500 may include and/or involve one or more steps, apparatus and/or features described with regard to process 400 (shown in FIG. 4). Process 500 may begin at step 502.

At step 502, a deployment of an object may be initiated. The deployment may include an attempt at the deployment. The attempt may be user-initiated. The attempt may be automatic. The deployment may include an initial attempt at the deployment. The deployment may include an intermediate attempt at the deployment. The deployment may include a final attempt at the deployment. The deployment may include a first attempt at the deployment. The deployment may include a second attempt at the deployment.

The deployment may include and/or involve one or more parameters associated with the deployment. The user may attempt to deploy one or more components. The component(s) may be associated with one or more than one software application. The components may include and/or involve the software application(s). The application(s) may include and/or involve one or more than one object. The parameter(s) may be associated with one or more of the application(s). The parameter(s) may be associated with one or more of the object(s).

The component(s) may include and/or involve email component 404 (shown in FIG. 4). The components may include journey component 406 (shown in FIG. 4). The components may include data extension component(s) 408 (shown in FIG. 4).

At step 504, a processor executing instructions may check a readiness of a target environment for receiving the deployed components. The instructions may include an intelligent algorithm. The algorithm may evaluate a completeness of a target environment. The target environment may include the destination environment. The completeness may include readiness. The target environment may include a target "sandbox".

At step 506, upon detection that the target environment may not be ready for the deployment, the deployment may be stopped. The target environment may be detected as in an unready state. The target environment may be inaccessible. The target environment may be offline. Unreadiness of the target environment may trigger cancellation of the deployment. The target environment unreadiness may trigger a delay of the deployment. The target environment unreadiness may trigger the stopping. The target environment unreadiness may trigger recalibration of the deployment. The target environment unreadiness may trigger recalibration of the target environment.

A log may be created associated with stopping of the deployment. The log may include a reason for the stopping. The log may include a reason for the unreadiness. The log may include one or more details associated with the stopping. The log may include one or more details associated with the unreadiness. The log may include a metadata table. Data associated with the stopping may be inserted into the metadata table.

The log may be transmitted for review. The review may be automatic. The review may be manual. The review may be performed by an entity. The entity may be responsible for reviewing deployments. The entity may be responsible for calibrating the deployments. The entity may be responsible for calibrating the target environment.

At step 508, upon detection that the target environment may be ready for the deployment, readiness of the components may be verified. A log may be created associated with readiness of the target environment. The detection may trigger generation of the log. Generation of the log may include insertion of data into the metadata table. The log may include the metadata table. The log may be transmitted for the review.

The algorithm may instruct the processor to perform one or more than one verification of the components. The verification may be performed prior to the deployment. The verification may be performed prior to completion of the deployment. The verification may be performed prior to finalization of the deployment. The verification may be of one or more than one quality of the components. The verification may determine a readiness of the components for deployment. The processor executing the instructions may employ the algorithm to determine the quality of the components. The algorithm may involve machine learning. The quality may suggest a likelihood of success of the deployment. The quality may include the readiness.

At step 510, one or more than one status of one or more of the components may be checked. The algorithm may instruct the processor to perform checking of the status. The verification may include the checking of the status. The quality may include the status. The status may include a draft state. The status may include a deleted state. The status may include a stopped state. The status may include a published state. One or more properties of the component(s) may be evaluated to determine the status. The properties may have been generated manually. The properties may have been generated automatically. The properties may indicate the status.

At step 512, a transmittal preview verification may be performed. The preview verification may be configured to verify if the preview component may be displayed correctly. The preview verification may be configured to verify if the email preview may be displayed correctly. Correct displaying of the preview may include presentation of static and/or standardized text of the email(s). Correct displaying of the preview may include presentation of personalized text of the email(s). The preview verification may be performed prior to delivery of the email(s). The preview verification may be performed for one or more than one selected email template. The preview verification may be performed prior to, during and/or after the email template(s) is deployed. The preview verification may evaluate readiness of one or more than one preview of one or more than one transmittal associated with the deployment. The deployment may include and/or involve the transmittal. One or more of the component(s) may include and/or involve the transmittal. One or more of the object(s) may include and/or involve the transmittal. The preview verification may evaluate the readiness via the preview(s). The transmittal may include the email. The transmittal may include the email template. The algorithm may be configured to perform the verification. The preview verification may be performed prior to the deployment. The algorithm may evaluate one or more of the component(s) via the preview verification.

At step 514, a transmittal verification may be performed. The transmittal verification may evaluate readiness of the transmittal. The transmittal may include and/or involve one or more than one transmission function. The transmission function may be associated with transmitting the email. The transmission function may include the transmitting of the email.

The algorithm may be configured to perform the transmittal verification. The verification may be performed prior to the deployment. The algorithm may evaluate one or more of the components via the verifying preview. The evaluated component(s) may be associated with the transmittal. The evaluated component(s) may be associated with the transmission function. The evaluated component(s) may be dependent upon the transmittal. The algorithm may evaluate dependency of the email on a cloud send email functionality. The algorithm may evaluate the send email functionality.

At step 516, one or more than one dynamic parameter associated with the deployment may be verified. The parameter(s) may be associated with one or more of the component(s). The one or more of the component(s) may be dynamic. The dynamic component(s) may include the parameters. The parameter(s) may be associated with parameter(s) of previous deployment attempt(s). The previous attempt(s) may have been successful. The previous attempt(s) may have failed. The previous deployment parameter(s) may be associated with success and/or failure of the previous attempt(s). The previous deployment parameter(s) may indicate a likelihood of success of the deployment. The likelihood may be based on the success and/or the failure of the previous attempt(s).

The algorithm may retrieve previous deployment parameter(s). The algorithm may determine the likelihood of success based on the retrieved parameters. The algorithm may adjust the components based on the likelihood. The algorithm may calibrate the components based on the likelihood.

At step 518, the checking of the status of the component(s) may be performed. The checking may include determining whether the status includes the draft state. The checking may include determining whether the status includes the deleted state. The checking may include determining whether the status includes the stopped state. The checking may include determining whether the status includes the published state.

At step 520, a status determination may be made. The determination may include that the status may be the published state. The determination may include that the status may be none of the draft state, deleted state and the stopped state.

Upon the determination, an indication may be generated to indicate a complete state (CS) of the component(s) associated with the status. Upon the determination, a null value may be added to a failure weightage associated with the deployment. The null value may indicate a low likelihood of failure of the deployment. The null value may indicate that the likelihood is null. Upon the determination, a positive value may be added to a success weightage associated with the deployment. The positive value may indicate a high likelihood of the failure. The positive value may indicate that the likelihood is positive. The positive value may reflect a proportion associated with the determination relative to a total of determinations of readiness of the deployment. The proportion may be based on the total number of the determinations. The proportion may be weighted based on a property of the determination. In a set including n determinations, the determination may contribute $1/n$ toward the success weightage and/or the failure weightage. In a set including four determinations, the determination may contribute 25% toward the success weightage and/or the failure weightage.

At step 522, the verification(s) of the preview(s) may be performed. The preview verification(s) may include determining whether the preview(s) may be ready. The verification may include determining readiness of the component(s) including and/or involving the preview(s).

At step 524, a determination may be made that the preview(s) may be ready. Upon the determination, an indication may be generated to indicate a complete state (CS) of the component(s) associated with the preview.

Upon the determination, the null value may be added to the failure weightage associated with the deployment. Upon the determination, a positive value may be added to the success weightage associated with the deployment. The positive value may indicate a high likelihood of the failure. The positive value may indicate that the likelihood is positive. The positive value may reflect a proportion associated with the determination relative to the total of determinations of readiness of the deployment. The proportion may be based on the total number of the determinations. The proportion may be weighted. In the set including n determinations, the determination may contribute 1/n toward the success weightage and/or the failure weightage. In the set including four determinations, the determination may contribute 25% toward the success weightage and/or the failure weightage.

At step 526, the verification(s) of the transmittal(s) may be performed. The transmittal verification(s) may include determining whether the transmittal(s) may be ready. The verification may include determining whether the component(s) including and/or involving the transmittal(s) may be ready.

At step 528, a determination may be made that the transmittal component(s) may be ready. Upon the determination, an indication may be generated to indicate a complete state (CS) of the component(s) associated with the transmittal component(s). Upon the determination, the null value may be added to the failure weightage. Upon the determination, a positive value may be added to the success weightage. The positive value may indicate a high likelihood of the failure. The positive value may indicate that the likelihood is positive. The positive value may reflect a proportion associated with the determination relative to the total of determinations of readiness of the deployment. The proportion may be based on the total number of the determinations. The proportion may be weighted. In the set including n determinations, the determination may contribute 1/n toward the success weightage and/or failure weightage. In the set including four determinations, the determination may contribute 25% toward the success weightage and/or the failure weightage.

At step 530, the verification(s) of the dynamic component(s) may be performed. The verification may include determining values associated with the dynamic parameter(s) associated with the dynamic component(s). The dynamic component verification(s) may include determining whether the dynamic component(s) may be ready. The verification may include determining whether the component(s) including and/or involving the dynamic parameter(s) may be ready. The verification may include and/or involve previous value(s) associated with previous instance(s) of the dynamic parameter(s). The previous instances may include and/or involve one or more than one previous failure(s) of previous deployment(s). The previous instances may include and/or involve one or more than one previous success(es) of previous deployment(s). The value(s) may indicate a likelihood of failure of the deployment. The value(s) may indicate a likelihood of success of the deployment.

At step 532, a determination may be made that the dynamic component(s) may be ready. Upon the determination, an indication may be generated to indicate a complete state (CS) of the component(s). Upon the determination, the null value may be added to the failure weightage associated with the deployment. Upon the determination, a positive value may be added to the success weightage. The positive value may indicate a high likelihood of the failure. The positive value may indicate that the likelihood is positive. The positive value may reflect a proportion associated with the determination relative to the total of determinations of readiness of the deployment. The proportion may be based on the total number of the determinations. The proportion may be weighted. In the set including n determinations, the determination may contribute 1/n toward the success weightage and/or failure weightage. In the set including four determinations, the determination may contribute 25% toward the success weightage and/or the failure weightage.

At step 534, a status determination may be made. The determination may include that the status may not be the published state. The determination may include that the status may be one or more than one of the draft state, deleted state and the stopped state. Upon the determination, an indication may be generated to indicate an incomplete state (IS) of the component(s) associated with the status. Upon the determination, the null value may be added to the success weightage associated with the deployment. Upon the determination, a positive value may be added to the failure weightage associated with the deployment. The positive value may reflect a proportion associated with the determination relative to the total of determinations of unreadiness of the deployment. The proportion may be based on the total number of the determinations. The proportion may be weighted. In the set including n determinations, the determination may contribute 1/n toward the success weightage and/or failure weightage. In the set including four determinations, the determination may contribute 25% toward the success weightage and/or failure weightage.

At step 536, a determination may be made that the preview(s) may not be ready. Upon the determination, an indication may be generated to indicate an incomplete state (IS) of the component(s) including and/or involving the preview. Upon the determination, an indication may be generated to indicate an incomplete state of the component(s) associated with the preview. Upon the determination, the null value may be added to the success weightage associated with the deployment. Upon the determination, a positive value may be added to the failure weightage associated with the deployment. The positive value may reflect a proportion associated with the determination relative to the total of determinations of unreadiness of the deployment. The proportion may be based on the total number of the determinations. The proportion may be weighted. In the set including n determinations, the determination may contribute 1/n toward the success weightage and/or failure weightage. In the set including four determinations, the determination may contribute 25% toward the success weightage and/or failure weightage.

At step 538, a determination may be made that the transmittal(s) may not be ready. Upon the determination, an indication may be generated to indicate an incomplete state (IS) of the component(s) including and/or involving the transmittal. Upon the determination, an indication may be generated to indicate an incomplete state of the component(s) associated with the transmittal. Upon the determination, the null value may be added to the success weightage associated with the deployment. Upon the determination, a positive value may be added to the failure weightage associated with the deployment. The positive value may reflect a proportion associated with the determination relative to the total of determinations of unreadiness of the deployment. The proportion may be based on the total number of the determinations. The proportion may be weighted. In the set including n determinations, the determination may contribute 1/n toward the success weightage and/or failure weightage. In the set including four determinations, the determination may contribute 25% toward the success weightage and/or failure weightage.

At step 540, a determination may be made that the dynamic component(s) may not be ready. Upon the determination, an indication may be generated to indicate an incomplete state (IS) of the dynamic component(s). Upon the determination, an indication may be generated to indicate an incomplete state of the dynamic component(s). Upon the determination, the null value may be added to the success weightage associated with the deployment. Upon the determination, a positive value may be added to the failure weightage associated with the deployment. The positive value may reflect a proportion associated with the determination relative to the total of the determinations of unreadiness of the deployment. The proportion may be based on the total number of the determinations. The proportion may be weighted. In the set including n determinations, the determination may contribute 1/n toward the success weightage and/or the failure weightage. In the set including four determinations, the determination may contribute 25% toward the success weightage and/or the failure weightage.

At step 542, a failure weightage associated with the verifications may be determined. The verification weightage may include a total of contributions from the determinations. A value assigned to the failure weightage may be proportional to a number of unready components.

In some embodiments, a success weightage may be determined. In these embodiments, a value assigned to the success weightage may be proportional to a number of ready components. Different of the components may be weighed in a different fashion. The components may be weighted based on one or more distinct properties of the components. The properties may indicate a likelihood of failure of the deployment.

At step 544, a determination may be made that the verification weightage indicates a low risk of deployment failure. The determination may be made that the verification weightage indicates a high likelihood of deployment success.

The failure weightage may be determined to be at a low level. The low level may indicate the low risk of deployment failure. The low level may include a weightage of zero. The low level may include a weightage less than 100%. The low level may include a weightage less than 50%. The determination may be made that the failure weightage may be a sum of null values. The determination may be made that the failure weightage may be zero.

The success weightage may be determined to be at a high level. The high level may indicate the low risk of deployment failure. The high level may include a weightage greater than zero. The high level may include a weightage of 100%. The high level may include a weightage between 0 and 100%. The high level may include a weightage greater than 50%. The determination may be made that the success weightage may be a sum of positive values. The determination may be made that the success weightage may be greater than zero.

At step 546, a determination may be made that the verification weightage indicates a high risk of deployment failure. The determination may be made that the verification weightage indicates a low likelihood of deployment success.

The failure weightage may be determined to be at a high level. The high level may indicate the high risk of deployment failure. The high level may include a weightage greater than zero. The high level may include a weightage of 100%. The high level may include a weightage between 0 and 100%. The high level may include a weightage greater than 50%. The determination may be made that the failure weightage may be a sum of positive values. The determination may be made that the failure weightage may be nonzero.

The success weightage may be determined to be at the low level. The low level may indicate the high risk of deployment failure. The determination may be made that the success weightage may be a sum of null values. The determination may be made that the success weightage may be zero.

An attempt may be made to recalibrate the deployment, in response to the high risk of failure. The deployment may be cancelled. The deployment may be delayed. The recalibration may be automatic. The recalibration may be manual. A report may be generated including data associated with the high risk. The data may include information regarding the components detected as incomplete. The data may include information regarding the components detected as unready. The report may be sent to an entity responsible for the deployment. The report may be sent to an entity responsible for calibrating the deployment. The entity may include an enterprise associate. The entity may include an enterprise employee. The data may be entered in to the metadata table. The data may be associated with the unready component(s). The data may include one or more than one dynamic parameter associated with the unready component(s).

At step 548, the deployment may be attempted. Step 548 may follow step 544. Completion of the deployment may be attempted. Execution of the deployment may be attempted. The processor executing program code may perform an attempt to deploy the application object(s) to the target environment.

At step 548, the deployment may have been attempted. Completion of the deployment may have been attempted. Execution of the deployment may have been attempted. The processor executing program code may have performed an attempt to deploy the application object(s) to the target environment.

At step 548, a determination may be made to evaluate whether the deployment was successful. The determination may be performed by the processor executing the program code. The determination may follow indication of a low likelihood of deployment failure. The indication may include the low failure weightage.

Success of the deployment may depend on feedback. The feedback may be automatic. The feedback may be manual. The feedback may include information about success of the deployment. The feedback may include information about successful running of the deployed application object(s). The feedback may include information about failed running of the deployed application object(s). The feedback may include one or more than one error message.

At step 550, upon determination that the deployment succeeded, one or more than one indication may be made indicating that the deployment may be complete. The indication may be logged. The indication may be entered into the metadata table. The indication may be associated with one or more than one parameter associated with the successful deployment. The parameters may be entered into the metadata table. The parameter(s) may be associated with the ready components.

At step 552, the deployment may be attempted. Step 552 may follow step 546. Completion of the deployment may be attempted. Execution of the deployment may be attempted. The processor executing program code may perform an attempt to deploy the application object(s) to the target environment.

At step 552, the deployment may have been attempted. Completion of the deployment may have been attempted. Execution of the deployment may have been attempted. The processor executing program code may have performed an attempt to deploy the application object(s) to the target environment.

At step 552, a determination may be made to evaluate whether the deployment was successful. The determination may be performed by the processor executing the program code. The determination may follow indication of a high likelihood of deployment failure. The indication may include the high failure weightage.

Success of the deployment may depend on feedback. The feedback may be automatic. The feedback may be manual. The feedback may include information about success of the deployment. The feedback may include information about successful running of the deployed application object(s). The feedback may include information about failed running of the deployed application object(s). The feedback may include one or more than one error message.

At step 554, upon determination that the deployment succeeded, one or more than one indication may be made indicating that the deployment may be complete. The indication may be logged. The indication may be entered into the metadata table. The indication may be associated with one or more than one parameter associated with the successful deployment. The parameters may be entered into the metadata table. The parameter(s) may be associated with the unready components.

At step 556, upon failure of the deployment, one or more parameters associated with the failure may be added to the metadata table. At step 556, upon failure of the deployment, one or more parameters associated with the failure may be added to the algorithm. Step 556 may follow step 548. Step 556 may follow step 552. Insertion of the parameters into the metadata table may be dynamic. Insertion of the parameters into the algorithm may be dynamic. The insertion may enable the recalibration of the algorithm. The insertion may enable the recalibration of the deployment. The recalibration may reduce a likelihood of failure of one or more than one later deployment.

Upon the recalibration, the later deployment may be attempted. The later deployment may include the second attempt. The later deployment may include the intermediate attempt. The later deployment may include the final attempt. The later deployment may be attempted at step 502. Attempt at the later deployment may be automatic. The attempt may be initiated by the algorithm. The processor executing the instructions may automatically initiate the later attempt.

Figure 6:
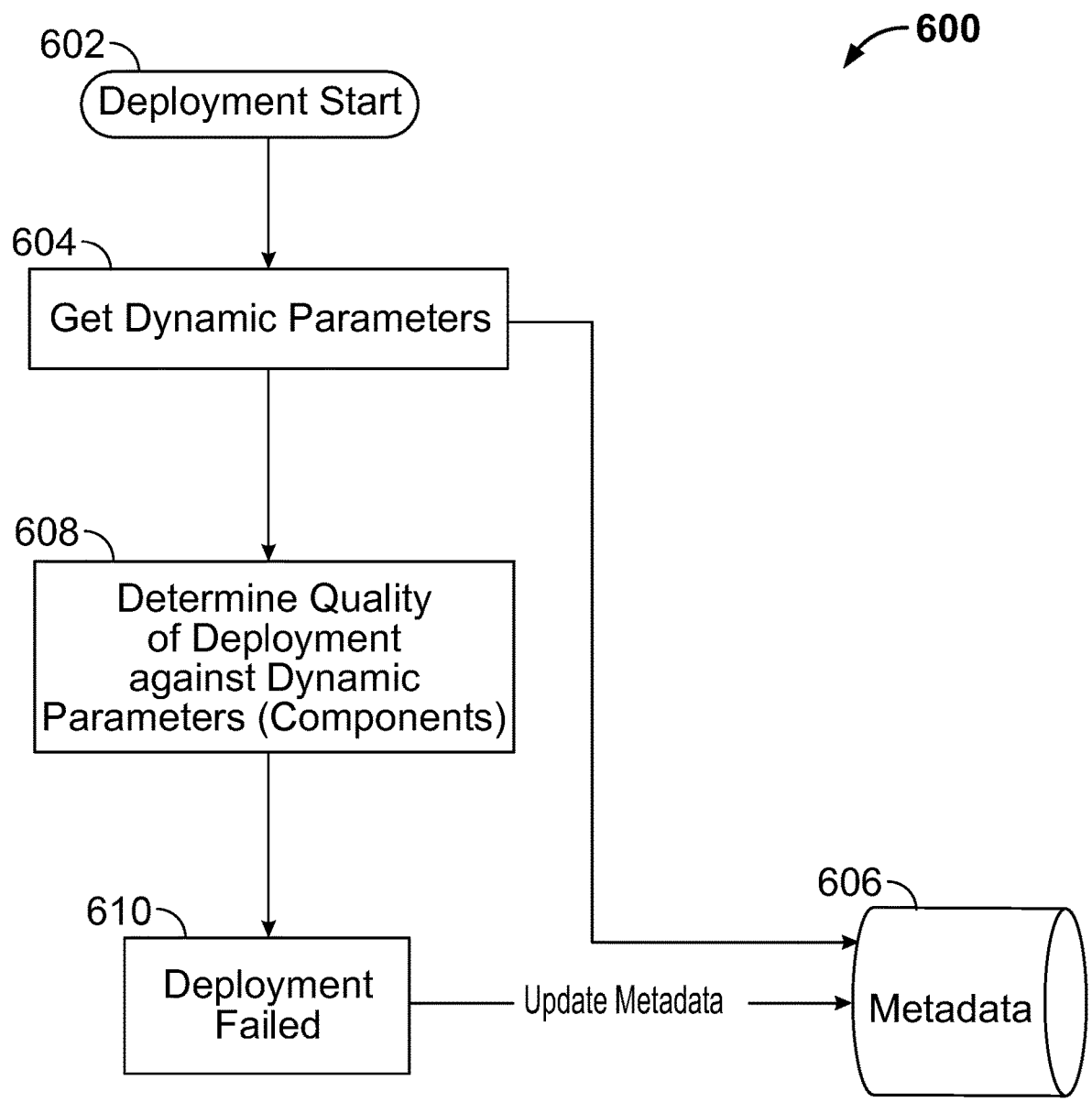
FIG. 6 is a flow chart of an illustrative process in accordance with principles of the invention.

FIG. 6 shows illustrative calibrated deployment process 600. Process 600 may include and/or involve one or more steps, apparatus and/or features described with regard to system 100 (shown in FIG. 1). Process 600 may include and/or involve one or more steps, apparatus and/or features described with regard to process 200 (shown in FIG. 2). Process 600 may include and/or involve one or more steps, apparatus and/or features described with regard to process 300 (shown in FIG. 3). Process 600 may include and/or involve one or more steps, apparatus and/or features described with regard to process 400 (shown in FIG. 4). Process 600 may include and/or involve one or more steps, apparatus and/or features described with regard to process 500 (shown in FIG. 5). Process 600 may begin at step 602.

At step 602, one or more than one deployment may be initiated. The deployment may include and/or involve one or more of features described in process 500 (shown in FIG. 5). The deployment may include one or more than one attempt at the deployment. The attempt may be user-initiated. The attempt may be automatic. The deployment may include an initial attempt at the deployment. The deployment may include an intermediate attempt at the deployment. The deployment may include a final attempt at the deployment. The deployment may include a first attempt at the deployment. The deployment may include a second attempt at the deployment.

The deployment may include and/or involve one or more parameters associated with the deployment. The user may attempt to deploy one or more components. The component(s) may be associated with one or more than one software application. The components may include and/or involve the software application(s). The application(s) may include and/or involve one or more than one object. The parameter(s) may be associated with one or more of the application(s). The parameter(s) may be associated with one or more of the object(s).

The component(s) may include and/or involve email component 404 (shown in FIG. 4). The components may include journey component 406 (shown in FIG. 4). The components may include data extension component(s) 408 (shown in FIG. 4).

At step 604, one or more than one dynamic parameter associated with the deployment may be verified. The parameter(s) may be associated with one or more of the component(s). The one or more of the component(s) may be dynamic. The dynamic component(s) may include the parameters. The parameter(s) may be associated with parameter(s) of previous deployment attempt(s). The previous attempt(s) may have been successful. The previous attempt(s) may have failed. The previous deployment parameter(s) may be associated with success and/or failure of the previous attempt(s). The previous deployment parameter(s) may indicate a likelihood of success of the deployment. The likelihood may be based on the success and/or the failure of the previous attempt(s). The success and/or the failure of the previous attempt(s) may be associated with the dynamic parameter(s).

The dynamic parameter(s) may have been previously stored in metadata table 606. The dynamic parameter(s) may be retrieved from metadata table 606. An intelligent algorithm may retrieve the previous deployment parameter(s) from metadata table 606.

At step 608, the algorithm may determine a quality of the deployment against the retrieved dynamic parameters. The quality may include and/or involve the likelihood of success. The algorithm may adjust the components based on the likelihood. The algorithm may calibrate the components based on the likelihood.

The deployment may be attempted. Completion of the deployment may be attempted. Execution of the deployment may be attempted. The processor executing program code may perform an attempt to deploy the application object(s) to the target environment.

At step 610, a determination may be made to evaluate whether the deployment was successful. The determination may be performed by the processor executing the program code. The determination may follow indication of a high likelihood of deployment failure.

Upon failure of the deployment, metadata table 606 may be updated. One or more parameters associated with the failure may be added to metadata table 606. Insertion of the parameters into metadata table 606 may be dynamic. The insertion may enable recalibration of the algorithm. The insertion may enable the recalibration of the deployment. The recalibration may reduce a likelihood of failure of one or more than one later deployment.

Thus, apparatus and methods for a deployment engine incorporating an intelligent algorithm are provided. Persons skilled in the art will appreciate that the present invention can be practiced by other than the described embodiments, which are presented for purposes of illustration rather than of limitation. The present invention is limited only by the claims that follow.

What is claimed is:

1. An application deployment engine for calibrating deployment of a cloud-based application object, the engine comprising:
   a processor; and
   a machine-readable memory including machine-executable instructions, the instructions, when executed by the processor, instructing the processor to:
      receive authentication information of a user;
      perform an authentication of the user based on the received authentication information;
      upon the authentication, receive a selection by the user to perform an application object transferal, the selection comprising:
         the application object selected for inclusion in the transferal;
         a selected source environment of the object; and
         a selected entity unit receiving the transferal;
      retrieve at least one previously stored dynamic parameter from a metadata table;
      using an intelligent algorithm, perform a determination of a quality of the application object deployment, the intelligent algorithm being based on:
         a detected status of the application object, the application object status including one of:
            a draft state;
            a deleted state;
            a stopped state; and
            a published state;
         a detected readiness value of a target environment associated with the selected entity unit;
         a detected readiness value of a preview component of the application object;
         a detected readiness value of components associated with electronic transmission of the application object; and
         the dynamic parameter;
      attempt deploying of the application object;
      upon a failure of the deploying, determine at least one parameter associated with the failure; and
      insert the at least one parameter into the metadata table for use in calibrating later deployment attempts.

2. The engine of claim 1 wherein the electronic transmission includes email.

3. The engine of claim 1 wherein the electronic transmission includes a virtual drop box.

4. The engine of claim 1 wherein the determination includes assigning a risk-of-failure weight to each of:
   the object status, wherein the risk-of-failure weight assigned to the published state is lower than the weight assigned to the draft state, the deleted state and the stopped state;
   the readiness of the preview component;
   the readiness of the components associated with the electronic transmission; and
   the dynamic parameter.

5. The engine of claim 1 wherein the quality is associated with a likelihood of the failure.

6. The engine of claim 1 wherein the authentication information includes at least one of:
   a password;
   a personal identification number;
   biometric information; and
   geographic information.

7. The engine of claim 1 wherein the target environment includes a simulation environment and the deployment is executed by the processor prior to deploying of the application to an enterprise client.

8. A method for deploying at least one cloud-based application object, the method comprising:
   authenticating a user;
   selecting the application object for transferal;
   selecting a source environment of the object;
   selecting a destination environment for receiving the transferal;
   retrieving at least one dynamic parameter from a metadata table, the at least one dynamic parameter associated, in the metadata table, with a success value of at least one previous deployment attempt;
   performing a determination of a level of readiness of components associated with the object, the determination depending on:
      a detected status of at least one of the components, the status including one of:
         a draft state;
         a deleted state;
         a published state; and
         a stopped state;
      an evaluation of a readiness value of the destination environment;
      a detected readiness value of a preview component of the object;
      a determined functionality value of an electronic transmission of the object; and
      the at least one dynamic parameter in association with the success value;
   upon the determination indicating a first level of readiness of the components:
      recalibrating one or more settings affecting the readiness; and
      recalculating the determination based on the recalibrated settings;
   upon the determination indicating a second level of readiness of the components, the second level indicating a determined readiness greater than the determined readiness indicated by the first level, attempting deployment of the application object;
   determining a success level of the deployment; and
   adjusting the success value of the at least one dynamic parameter, in the metadata table, to include the determined success level of the deployment.

9. The method of claim 8 further comprising:
upon the determination indicating a third level of readiness of the components, the third level indicating a determined readiness less than the determined readiness indicated by the first level, at least one of:
aborting the deploying; and
pausing the deploying.

10. The method of claim 8 wherein the electronic transmission includes email.

11. The method of claim 8 wherein the electronic transmission includes a virtual drop box.

12. The method of claim 8 wherein the indicator of the success level includes at least one failed parameter.

13. The method of claim 8 wherein the authenticating includes at least one of:
collecting biometric data of the user;
collecting location data of the user; and
scanning a matrix bar code presented on a device of the user.

14. The method of claim 8 wherein the destination environment includes a simulation environment and the deployment is executed by the processor prior to deploying of the application to an enterprise client.

15. An application deployment system for performing a deployment of at least one cloud-based application, the application including a plurality of components, the system comprising:
a processor; and
a machine-readable memory including machine-executable instructions, the instructions, when executed by the processor, instructing the processor to:
evaluate a readiness of a target environment for receiving the deployment;
prior to the deployment, perform an assignment of a deployment-quality score to the deployment, the score based on four determinations, each of the four determinations associated with a weight contributing 25% toward a total of the score, the determinations including:
a determined status of the components, the status including one of:
a draft state;
a deleted state;
a stopped state; and
a published state;
a determined readiness of an electronic transmission preview function included in the components;
a determined functionality of an electronic transmission send function included in the components; and
a determined readiness of at least one dynamic component associated with at least one previously stored dynamic parameter;
attempt the deployment; and
upon a detected failure of the deployment, add a total score and at least one dynamic parameter associated with the failure to a metadata table;
wherein the electronic transmission includes email.

16. The system of claim 15 wherein the electronic transmission includes a virtual drop box.

17. The system of claim 15 wherein the target environment includes a simulation environment and the deployment is executed by the processor prior to deploying of the application to an enterprise client.

18. An enterprise application deployment engine for performing a deployment of at least one cloud-based application to at least one target environment, the application including a plurality of components, the engine comprising:
a processor; and
a machine-readable memory including machine executable instructions, the instructions, when executed by the processor, instructing the processor to:
prior to the deployment, perform an assignment of a deployment-quality score to the deployment, the score based on a plurality of determinations including:
a determined status of the application, the status including one of:
a draft state;
a deleted state;
a stopped state; and
a published state;
a determined readiness of an electronic transmission preview component;
a determined functionality of an electronic transmission send component; and
a determined readiness of at least one dynamic component including at least one dynamic parameter;
evaluate a readiness of the target environment for receiving the deployment; and
upon a detected failure of the deployment, add a total score and at least one dynamic parameter associated with the failure to a metadata table;
wherein the electronic transmission includes a virtual drop box.

19. The engine of claim 18 wherein the electronic transmission includes email.

20. The engine of claim 18 wherein the at least one target environment includes a plurality of target environments.

21. The engine of claim 18 wherein the instructions, when executed by the processor, further instruct the processor to, prior to the deployment, perform an authentication of an identifier of a user executing the deployment, the authentication including at least one of at least one of:
collecting biometric data of the user;
receiving at least one alphanumeric code from the user;
collecting location data of the user; and
scanning a matrix bar code presented on a device of the user.

22. The engine of claim 18 wherein the target environment includes a simulation environment and the deployment is executed by the processor prior to deploying of the application to an enterprise client.

* * * * *